United States Patent [19]
Spangenberg

[11] Patent Number: 6,022,176
[45] Date of Patent: Feb. 8, 2000

[54] TOOL BIT WITH MARKING MEMBER

[75] Inventor: Rolf Spangenberg, Gauting, Germany

[73] Assignee: Hilti Aktiengesellschaft, Schaan, Liechtenstein

[21] Appl. No.: 08/833,753

[22] Filed: Apr. 9, 1997

[30] Foreign Application Priority Data

Apr. 9, 1996 [DE] Germany ............................ 196 13 999

[51] Int. Cl.⁷ .................................................. B23B 51/00
[52] U.S. Cl. ................................. 408/16; 82/1.2; 175/413; 408/22
[58] Field of Search .................................. 408/16, 22, 24, 408/30, 200, 202, 224, 241 S; 175/327, 412, 413; 82/1.2

[56] References Cited

U.S. PATENT DOCUMENTS

| | | | |
|---|---|---|---|
| 2,344,143 | 3/1944 | Harding | 408/202 |
| 4,039,266 | 8/1977 | O'Connell | 408/202 |
| 4,768,599 | 9/1988 | Eischeid. | |
| 4,993,894 | 2/1991 | Fischer et al. | 408/202 |
| 5,795,110 | 8/1998 | Wirth, Jr. et al. | 408/241 S |

FOREIGN PATENT DOCUMENTS

| | | |
|---|---|---|
| 3643663 | 6/1988 | Germany. |
| 8804043 | 12/1988 | Germany. |
| 4015749 | 11/1991 | Germany. |
| 294107 | 12/1991 | Japan ........................................ 408/24 |
| 501331 | 8/1938 | United Kingdom ............... 408/241 S |
| 1284382 | 8/1972 | United Kingdom. |

OTHER PUBLICATIONS

European Search Report, No. EP 97 810 165.7 dated Nov. 17, 1998.

*Primary Examiner*—Daniel W. Howell
*Attorney, Agent, or Firm*—Brown & Wood, LLP

[57] ABSTRACT

A tool bit for working in a previously drilled blind bore (5) has a shank section (2) insertible into the blind bore and a chuck section (1) extending co-axially from a drilling end of the shank section. A marking member (15) facing toward the base of the blind bore is mounted on the shank section (2) so that it rotates with the shank section.

7 Claims, 1 Drawing Sheet

U.S. Patent
Feb. 8, 2000
6,022,176
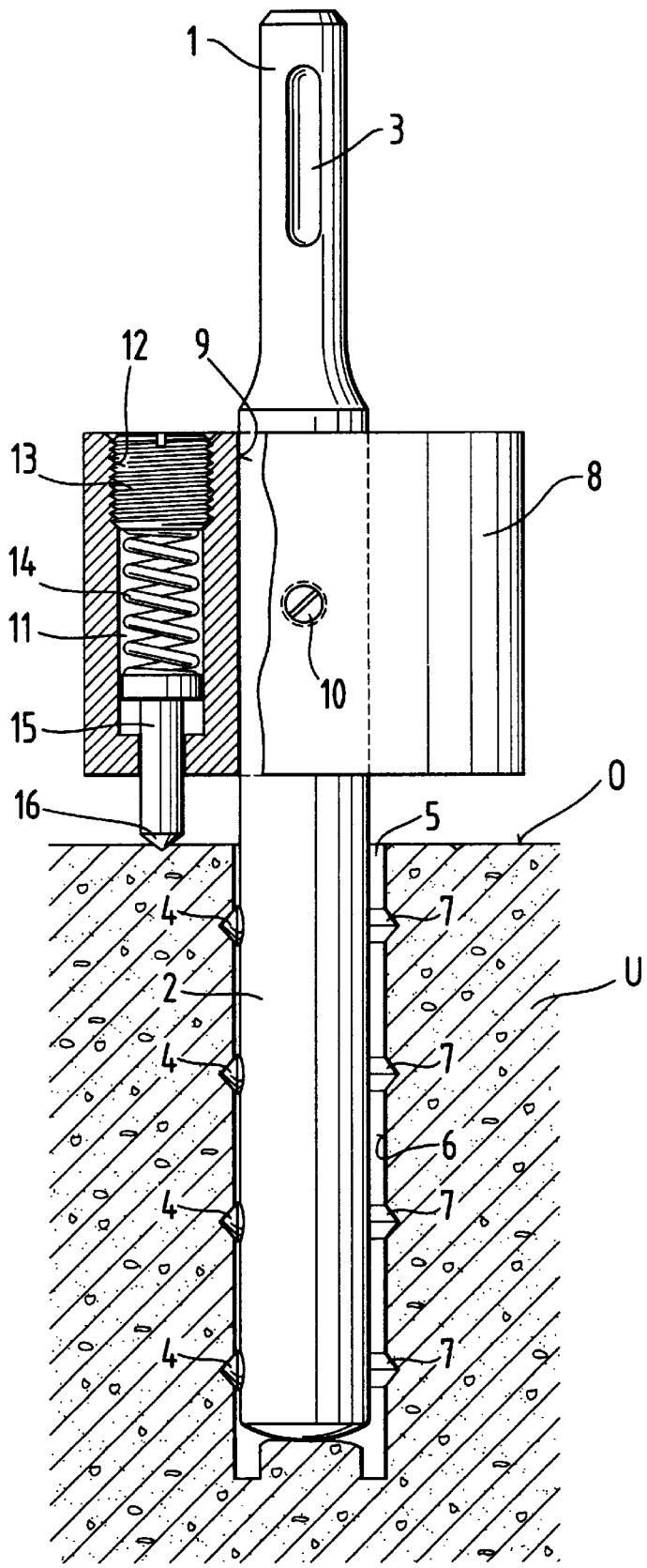

TOOL BIT WITH MARKING MEMBER

BACKGROUND OF THE INVENTION

The present invention is directed to a tool bit for working in a previously drilled blind bore and includes a shank section insertible into the blind bore and a chuck section extending co-axially from the shank section away from the blind bore.

In view of the use to which such bores are used, it is frequently necessary to effect further work in the bore. Such a further working operation can, for instance, be for cleaning, roughening, smoothing or undercutting the surface of the bore.

Particularly when using diamond-tipped hollowed drill bits or crowns for forming blind bores in which an anchor is to be fixed by a bonding mass, it is necessary to rework the surface of the blind bore by roughening or undercutting it. A tool bit for forming such undercuts is disclosed in EP 0 289 988.

This known tool bit has a shank section with several cutting members arranged in a row in the axial direction of the shank section with the cutting members projecting outwardly from the surface of the shank section. A chuck section arranged co-axially relative to the shank section and adjacent to it can be secured in a drilling device.

In the course of the subsequent inspection of the drilled bores, it cannot be determined from the outside whether the surface in the bore has been reworked.

SUMMARY OF THE INVENTION

Therefore, the primary object of the present invention is to provide a tool bit which indicates in a simple and reliable manner whether a previously drilled bore has been reworked, which reworking is necessary in view of the above-mentioned requirements.

In accordance with the present invention, a marking member is mounted radially outwardly from the shank section with a marking tip facing the receiving material in which the previously drilled bore is located. The arrangement of the marking member of the present invention facing toward the receiving material and located radially outwardly from the shank section and being rotational with the shank section enables the production of a circularly-shaped marking on the surface of the receiving material.

The spacing between the leading end of the shank section and the leading end of the marking member is somewhat smaller than the depth of the blind bore, so that the marking member on the one hand does not penetrate too deeply into the surface of the receiving material, however, it does form a marking on the surface of the receiving material.

The marking formed on the surface of the receiving material is a visual indication that the reworking of the previously drilled blind bore has taken place.

Preferably, the marking member is spring biased in the direction of the receiving material.

To enable the use of a single tool bit for reworking the surface of blind bores of different depths, the marking member is preferably biased by a spring in the direction towards the receiving material.

Before commencing the reworking operation, the shank section of the tool bit of the present invention is inserted into the blind bore until it contacts the base of the bore. When the shank section is inserted, a displacement of the shank section relative to the marking member takes place as soon as the marking member contacts the surface of the receiving material containing the blind bore. As a result, the spring acting on the marking member is compressed and prestressed. The prestressing force of the spring presses the marking member against the surface of the receiving material, whereby the marking member is pressed against the surface of the receiving material during the reworking operation and produces a visual marking.

Expediently, the marking member is located in a support ring mounted on the shank section, so that the marking member can be located at a greater radial distance outwardly from the shank section.

For a simpler and more economical production of the tool bit, preferably the marking member is biased by a spring relative to the support ring.

Since the marking member is subject to wear, its replaceability is advantageous. Rapid replacement is possible, if the entire support ring mounting the marking member is arranged to be completely replaced. To effect such replacement, it is expedient if the support ring is detachably connected to the shank section.

A simple marking of the receiving material surface is effected with a marking member having at least one essentially cone-shaped marking tip. A stepped, cylindrical section of the marking member follows the marking tip and is received in a correspondingly shaped stepped holding bore in the support ring and is guided so that it can be axially displaced.

It is preferable if at least the marking tip is formed of hard metal when the blind bore is to be reworked in a hard receiving material, such as concrete, rock and the like.

BRIEF DESCRIPTION OF THE DRAWING

The drawing is an elevational view, partly in section, of a tool bit embodying the present invention.

DETAILED DESCRIPTION OF THE INVENTION

In the drawing a tool bit is shown for forming undercuts 7 in a previously drilled blind bore 5. The tool bit comprises an axially extending cylindrical shank section 2 inserted into the blind bore 5 and a chuck section 1 coaxial with and extending from the shank section 2 outwardly from the surface 0 of a receiving material U in which the blind bore 5 is formed.

Cutting members 4 are arranged spaced from one another in a row parallel to the axial direction of the shank section 2 and project radially outwardly from the surface of the shank section. These cutting members 4 have cutting tips.

The chuck section 1 can be inserted into a drilling device, not shown. The chuck section 1 has an axially extending groove 3 closed at its opposite ends and arranged to provide an axial locking means so that the tool bit is connected to and rotates with the drilling device.

The diameter of the blind bore 5 corresponds essentially to the diameter of the shank portion 2 and the amount which the cutting members 4 project radially outwardly from the shank section 2.

A support ring 8 is positioned in a trailing end region of the shank section 2 adjacent the chuck section 1 so that it is locked to the tool bit and rotates with it. The support ring 8 has an axially extending through bore 9 with a diameter corresponding substantially to the diameter of the shank section 2. The support ring 8 is secured to the shank section 2 by a clamping member 10 in the form of a set screw so that it is held in the axial direction and is rotatable with the tool bit.

In a part of the support ring 8, surrounding the shank section 2 and spaced outwardly from it, there is an axially extending borehole 11 having a number of different diameter sections reducing in the direction towards the receiving material U. The borehole 11 has three sections, each with a different internal diameter facing the receiving material U. At its leading end, the borehole 11 has the smallest inside diameter.

The first section of the borehole provides axial guidance for a axially extending cylindrical section of a marking member 15 projecting from the support ring 8 towards the receiving material U. A second section of the borehole 11 extends from the first section away from the receiving material and has a diameter greater than the diameter of the first section.

The second section acts as a guide for a head formed on the trailing end of the cylindrical section of the marking member 15 with the head formed integrally with the cylindrical section and providing a single part. The diameter of the head extending radially outwardly from the cylindrical section corresponds to the inside diameter of the second section. The second section contains an axially-extending spring 14 which is compressed when the marking member is displaced relative to the support ring 8 opposite to the drilling direction of the tool bit. The spring 14 maintains contact of the marking member 15 with the surface 0 of the receiving material U in case of different depths of the blind bores 5.

A third section of the borehole 11 extends from the second section to the trailing end of the support ring 8 and has an inside thread 12 cooperating with an outside thread of a sealing cap or nut 13. The diameter of the inside thread 12 is larger than the inside diameter of the second section of the borehole 11.

The axially displaceable marking member 15 positioned in the support ring 8 has a cone-shaped marking tip 16 at its leading end. The marking tip 16 provides a marking on the surface 0 of the receiving material U adjacent the opening to the blind bore 5 in the surface 0.

When the tool bit of the present invention is inserted into the previously drilled blind bore 5 for forming undercuts 7, the leading end of the shank section 2 contacts the base of the blind bore 5. At the same time, the spring biased marking member 15 contacts the surface 0 of the receiving material U. As a result, the spring 14 located in the borehole 11 is compressed to an extent depending upon the depth of the blind bore 5. Subsequently, a drilling tool, not shown, connected to the chuck section 1 of the tool bit is activated. An eccentric rotation of the tool bit results from the single side arrangement of the cutting members 4 on the shank section 2, whereby the cutting members 4 contact a part of the wall 6 of the blind bore 5 and produce undercuts 7.

The tip 16 of the marking member 15 rotates with the tool bit and cuts an essentially circular shaped groove in the surface 0 of the receiving material U. This groove serves as evidence that the blind bore 5 has been reworked by forming the undercut 7.

While specific embodiments of the invention have been shown and described in detail to illustrate the inventive principles, it will be understood that the invention may be embodied otherwise without departing from such principles.

What is claimed is:

1. A tool bit for working in a previously drilled axially extending blind bore (5) comprises an axially extending shank section (2) having a leading end to be inserted first into the blind bore and a trailing end, and an axially extending chuck section (1) extending co-axially with and from the trailing end of said shank section (2), an axially extending marking member (15) located radially outwardly from and mounted on said shank section and having a first end facing towards the leading end of said shank section and an opposite second end, and said marking member being arranged to rotate with said shank section.

2. A tool bit, as set forth in claim 1, wherein means arranged for mounting said marking member (15) on said shank section (2) and said means including a spring (14) biasing said marking member in the direction towards the leading end of said shank section.

3. A tool bit, as set forth in claim 1 or 2, wherein said means comprises a support ring (18) encircling and secured to said shank section (2), with said marking member (15) mounted in said support ring.

4. A tool bit, as set forth in claim 3, wherein said marking member (15) being displaceable relative to said support ring (8) against the biasing force of said spring (14).

5. A drill bit, as set forth in claim 4, wherein said support ring (8) being detachably mounted on said shank section (2).

6. A tool bit, as set forth in claim 3, wherein said marking member (15) having at least one essentially cone-shaped tip (16) at the first end thereof.

7. A tool bit, as set forth in claim 6, wherein said at least one marking tip (16) being formed of a hard metal.

* * * * *